United States Patent
Larsson

(10) Patent No.: US 9,119,140 B2
(45) Date of Patent: Aug. 25, 2015

(54) METHOD AND IDENTIFICATION MODULE FOR NETWORK SELECTION

(75) Inventor: Thomas Larsson, Alvsjo (SE)

(73) Assignee: GIESECKE & DEVRIENT GMBH, Munich (DE)

( * ) Notice: Subject to any disclaimer, the term of this patent is extended or adjusted under 35 U.S.C. 154(b) by 5 days.

(21) Appl. No.: 14/131,261

(22) PCT Filed: Jul. 10, 2012

(86) PCT No.: PCT/EP2012/002902
§ 371 (c)(1),
(2), (4) Date: Jan. 7, 2014

(87) PCT Pub. No.: WO2013/007375
PCT Pub. Date: Jan. 17, 2013

(65) Prior Publication Data
US 2014/0141839 A1    May 22, 2014

(30) Foreign Application Priority Data
Jul. 12, 2011    (EP) .................................... 11005701

(51) Int. Cl.
H04W 48/18 (2009.01)
H04B 1/38 (2015.01)
H04W 8/20 (2009.01)
H04B 1/3816 (2015.01)

(52) U.S. Cl.
CPC ............ *H04W 48/18* (2013.01); *H04B 1/3816* (2013.01); *H04W 8/20* (2013.01)

(58) Field of Classification Search
CPC ....... H04B 1/3816; H04W 48/18; H04W 8/20
See application file for complete search history.

(56) References Cited

U.S. PATENT DOCUMENTS

| | | | |
|---|---|---|---|
| 5,497,412 A * | 3/1996 | Lannen et al. | 455/432.2 |
| 6,603,968 B2 * | 8/2003 | Anvekar et al. | 455/433 |
| 6,738,622 B1 * | 5/2004 | Stadelmann et al. | 455/435.1 |
| 7,899,939 B2 | 3/2011 | Carpenter et al. | |
| 2004/0176092 A1 * | 9/2004 | Heutschi | 455/435.1 |
| 2006/0021440 A1 | 2/2006 | Kawashima | |
| 2006/0211420 A1 | 9/2006 | Ophir et al. | |
| 2007/0281687 A1 * | 12/2007 | Jiang | 455/433 |
| 2007/0287419 A1 * | 12/2007 | Wang | 455/411 |
| 2008/0261655 A1 | 10/2008 | Carpenter et al. | |

FOREIGN PATENT DOCUMENTS

| | | |
|---|---|---|
| EP | 1983700 A1 | 10/2008 |
| WO | 2006032460 A1 | 3/2006 |
| WO | 2011080635 A2 | 7/2011 |

OTHER PUBLICATIONS

European Search Report for corresponding European Application No. 11005701.5, mailed Dec. 15, 2011.
International Search Report for corresponding International PCT Application No. PCT/EP2012/002902, mailed Oct. 17, 2012.

* cited by examiner

*Primary Examiner* — Kashif Siddiqui
(74) *Attorney, Agent, or Firm* — Workman Nydegger

(57) ABSTRACT

A method and an identification module SIM of a device in a mobile communication system wherein the SIM provides a first subscriber identity to the device and receives updates for a list of forbidden networks stored in a memory of the identification module. The SIM uses the received updates as a list of available networks for a second subscriber identity and provides the second subscriber identity to the device.

15 Claims, 2 Drawing Sheets

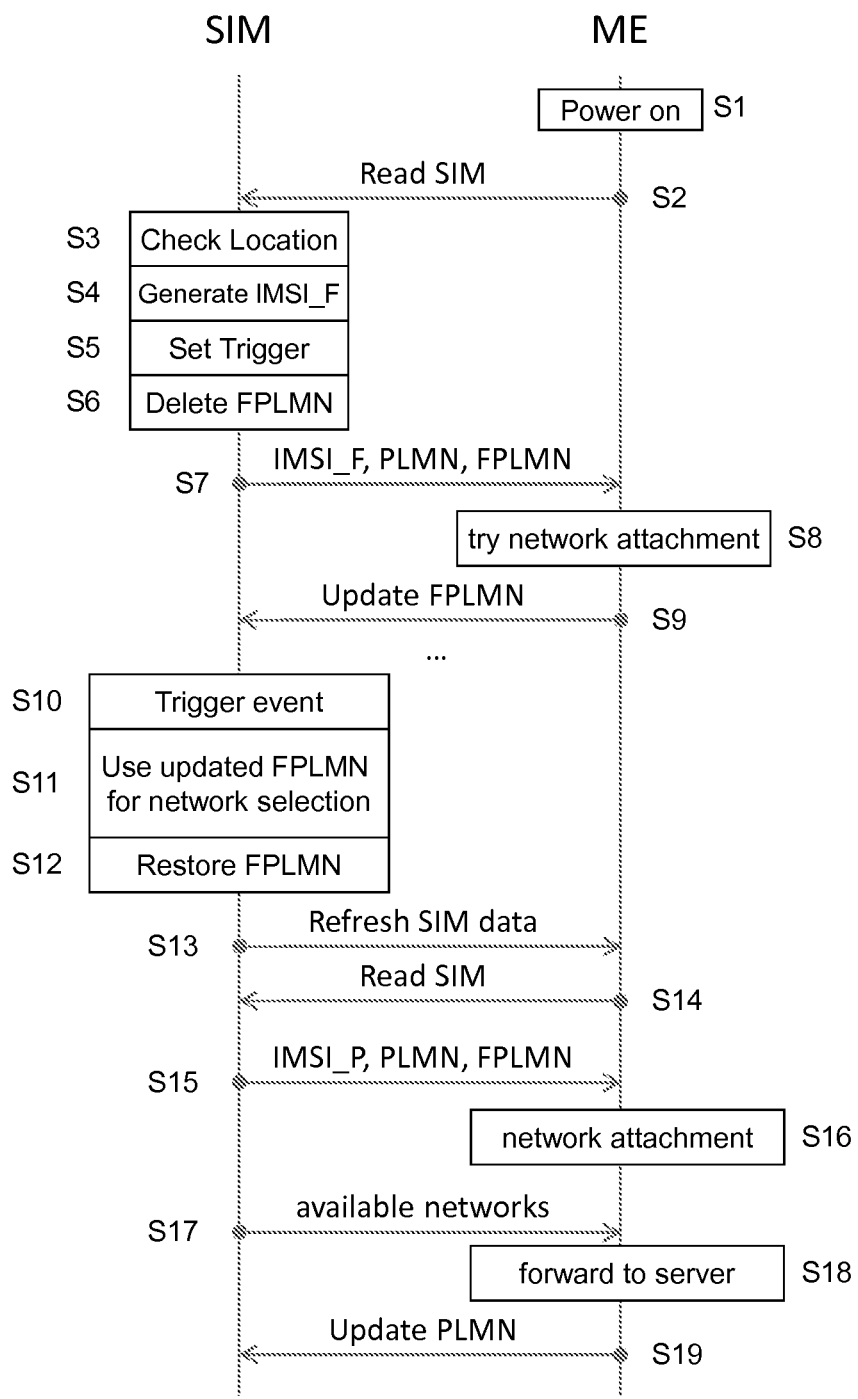

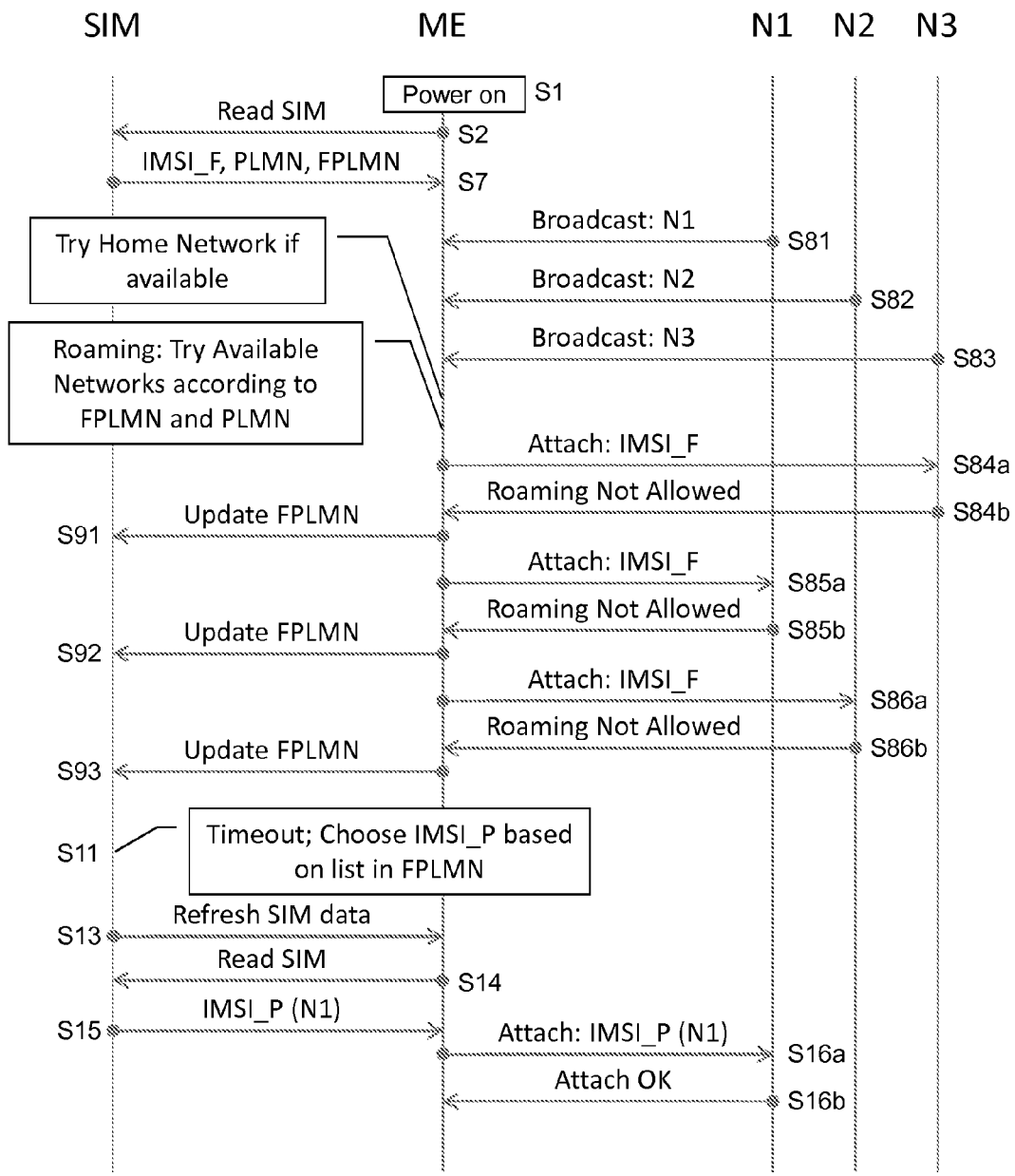

METHOD AND IDENTIFICATION MODULE FOR NETWORK SELECTION

BACKGROUND

The present invention refers to a method in an identification module, e.g. a SIM, and the corresponding identification module, which provides a list of available networks for a network selection.

SUMMARY

According to the GSM or 3GPP standards a SIM (Subscriber Identity Module) shall present an IMSI (International Mobile Subscriber Identity) to the mobile device when authenticating to a mobile communication network. When the mobile device is outside the HPLMN (Home Public Land Mobile Network) the mobile device shall be connected to a visited network. It is only possible to authenticate a mobile device to a visited network, where the operator of such network has a roaming agreement with the operator of the "home" network for the SIM.

The visited network to which the mobile device tries to attach will decide if it will allow an attach of a roaming subscriber, and if so the visited network will forward the authentication request to said home network. A subscriber is considered is considered "home" if the IMSI, the MCC (Mobile country Code) and the MNC (Mobile Network Code) match that of the visited network. The IMSI contains MCC and MNC.

If a roaming subscriber may not be attached to a visited network, the network will according to 3GPP standards present a message "roaming not allowed" to the mobile device.

A list of preferred roaming networks (PLMN list) may be stored in the memory of the SIM. The mobile device asks the SIM for said list. The mobile device measures different networks and makes a selection of a network allowed for roaming and attaches to the network. The selection is following the priority order of the list. A random selection of one network will occur, if no available network is on the list.

This means that when a roaming-allowed network is found the mobile device will attach to that network even if the network is not an optimal network for the time being, because all available networks have not been evaluated. This is especially true within the "home" country, where "national roaming" is usually not allowed.

EP 1983700 A1 describes a modified preferred network list which may be stored in SIM cards. Different preferred network lists for use in a roaming country are remotely provided by a server system for a mobile communication device in US 2006/021440 A1. According to WO 2011/080635 A2 new SIM cards are sold with a stored dummy IMSI code. Upon first use of the card the mobile communication system recognizes this code and writes a real IMSI code to the SIM card. WO 2006/032460 describes a SIM application that collects network availability information and selects the best available network. However, all networks may not be found.

The present invention solves this problem and makes it possible to detect available networks more reliably, in particular by being independent from device dependent functionality.

This object is achieved by the subject matter of the independent claims. Preferred embodiments of the invention are described in the dependent claims.

In an identification module, such as a SIM, of a device in a mobile communication system, the following steps are performed: providing a first subscriber identity to the device and receiving updates for a list of forbidden networks stored in a memory of the identification module. According to the invention the identification module further uses the received updates as a list of available networks for a second subscriber identity and provides the second subscriber identity to the device.

The subscriber identity preferably is represented by a subscriber identity number, e.g. an IMSI (International Mobile Subscriber Identity).

Preferably, the first (forbidden) subscriber identity is adapted to cause receipt of updates for the list of forbidden networks. Accordingly, the first subscriber identity should be unacceptable for as many networks as possible. The second (regular) subscriber identity is adapted to enable network attachment by the device. In an advantageous solution the identification module generates the first subscriber identity, preferably based on location information. Preferably, the first subscriber identity is an IMSI which contains an unacceptable MNC and/or MCC for networks at the location of the mobile device.

The list of forbidden networks may be a standardized data element in the system. Preferably, the list is the FPLMN (Forbidden Public Land Mobile Network) list stored in a corresponding file of the SIM.

The step of using comprises selecting one of the received networks, included in the updates, for network attachment. The network selection may be performed by the identification module and/or a network server, which receives the updated list from the identification module. Accordingly, in the identification module the step of using comprises the network selection and/or a step of providing the received networks to the network server for selecting a network for the mobile device. For example, the identification module may perform an initial network selection and send the updated list to the network server, which performs a secondary step of network selection for the mobile device.

The identification module may delete the list of forbidden networks. The step of deleting may be performed, as a first step of deleting, prior to the step of providing the first subscriber identity. An evaluation of an updated list by the SIM thereby can be simplified. Moreover, it can be avoided that the mobile device omits a network when scanning for available networks. Alternatively or in addition, the step of deleting may be performed prior to the step of providing the second subscriber identity. Preferably, such second step of deleting comprises (deleting the updated list and) restoring the list of forbidden networks deleted in the first step of deleting (prior to providing the first subscriber identity).

The device can be a mobile device for the mobile communication system, such as a mobile telephone, a computer or any other mobile device capable of communicating over the mobile communication network.

The present method reuses well known and widely implemented functions of ETSI standards of GSM, 2G, 3G or 4G mobile communication systems.

BRIEF DESCRIPTION OF THE DRAWINGS

In the following the invention is described in more detail, and in connection with an exemplifying embodiments of the invention shown in the attached drawings, where FIG. 1 illustrates the steps in an identification module of a mobile device; and FIG. 2 illustrates the steps in the system of SIM, mobile device and mobile communication network.

DETAILED DESCRIPTION OF VARIOUS EMBODIMENTS

The approach of the present solution in a mobile communication system and the misuse of standardized steps will be explained with reference to FIG. 2. Thereafter, a more detailed discussion of the steps in an identification module SIM of a mobile device ME follows with reference to FIG. 1.

The flowchart of FIG. 2 illustrates steps performed in the present system. The system comprises a subscriber identification module SIM arranged in a mobile device of a mobile communication system. The SIM shall be a separate hardware unit, which is permanently or reversibly arranged in the mobile device ME. A SIM identifies the subscriber in the mobile communication system, which includes multiple communication networks N1, N2, N3, preferably owned by different network operators.

In step 1 the mobile device is turned on. The mobile device ME reads S2, S7 data from the SIM, preferably by sending S2 at least one corresponding read request. Among the relevant data elements to be read from the SIM are: IMSI (International Mobile Subscriber Identity), the Forbidden Public Land Mobile Network list (FPLMN list) and Preferred Public Land Mobile Network list (PLMN list). The step of reading typically comprises one request per data element to be read from the SIM.

A prior art SIM in step S7 would provide its regular subscriber identity IMSI_P to the mobile device. The present SIM provides S7 a forbidden or incorrect IMSI, IMSI_F, to the mobile device. The forbidden IMSI IMSI_F is selected such that attempts of the mobile device to attach to the networks N1, N2 or N3 will fail and the mobile device will update the FPLMN list in the SIM with the (failed) available networks N1, N2 and N3. Hence, the SIM by providing S7 the forbidden IMSI_F causes the mobile device to update a list of forbidden networks in the SIM with available networks.

In the next steps S81, S82, S83 the mobile device receives signals from the networks N1, N2 and N3. Since the device has an invalid IMSI, the device will not find a "home" network and will immediately go into a "roaming mode". At roaming the mobile device ME tries, in the next steps S84a, S85a and S86a, to attach to available networks. When roaming it may consider the FPLMN list and the PLMN list received from the SIM.

The mobile device ME uses IMSI_F in the steps of network attachment S84a, S85, S86a. Thus the mobile device ME tries to connect the different networks N1, N2 and N3 with the forbidden IMSI_F and as a result the network in question will—according to the GSM or 3GPP standards—present S84b, S85b, S86b a message "Roaming Not Allowed" to the mobile device.

When the message "Roaming Not Allowed" is received by the mobile device ME, the mobile device updates S91, S92, S93 the FPLMN list in the SIM. The update S91 includes the available network N1 for which network attachment is forbidden with IMSI_F. The first message "Roaming Not Allowed" in step S84b will force the mobile device to try another network S85a, S86a, and correspondingly cause further updates S92, S93 of the FPLMN list.

After a period of time all available networks have been scanned in this way. The SIM may determine a corresponding timeout S11 and send S13 a refresh SIM data request to the mobile device ME. For example in response to such a request, the mobile device ME reads S14, S15 the SIM data again. The SIM in response to the second read request S14 now provides S15 a regular IMSI IMSI_P to the mobile device ME. The mobile device ME uses the regular IMSI_P for a successful network attachment S16a, 16b.

The SIM uses the updates received for the FPLMN list as a list of available networks for network selection. In a step of network selection one of the networks included in the list of available, forbidden networks is selected as the network to attach to for the regular subscriber identity IMSI_P of the SIM. The SIM will evaluate which network to attach to according to one or more criteria. The criteria can be prize for communication, signal strength etc, which parameters may have received by SIM at an earlier stage.

In the embodiment of FIG. 2 the SIM performs S11 network selection based on the FPLMN list and chooses one subscriber identity IMSI_P (N1) out of a number of subscriber identities. Alternatively, the SIM uses its regular IMSI_P and in accordance with the network selection amends the list of preferred networks PLMN.

By using a false IMSI_F, all available networks will be detected. In case a correct, permanent, IMSI, namely IMSI_P, had been used the mobile device could have attached to a network which is allowed, but that would not be the optimum network for the time being.

According to a preferred embodiment the false IMSI_F contains a right MCC but an unacceptable MNC compared to all possible networks at the location of the mobile device.

According to an alternative preferred embodiment the false IMSI_F contains a right MNC but an unacceptable MCC compared to all possible networks at the location of the mobile device.

According to still another alternative embodiment the false IMSI_F contains both an unacceptable MNC and MCC compared to all possible networks at the location of the mobile device.

According to yet another alternative embodiment the false IMSI_F contains a dummy MCC and/or MNC. A dummy MCC or MNC does not exist (is invalid) in the whole mobile communication system.

The list in the SIM for FPLMN is sometimes limited to four entries only. In order to get the most attractive networks on the list, the mobile device may be instructed to follow the preferred network list, listed as PLMN in the memory of the SIM when roaming, and therefore scan those networks first. This is a part of standard (GSM, 2G, 3G) behaviour.

As will be explained in more detail with reference to FIG. 1 when a proper network attach has been achieved, the result of the scan (the updated FPLMN list) and attach may be sent to a backend, such as the home operator, using the network, e.g. with SMS or USSD. Based on some business logic the backend may want to instruct the SIM to choose a different network than the one attached to, by sending an instruction to the SIM using SMS or USSD.

Providing a first subscriber identity in order to receive updates for a list of forbidden networks, such that the updates including available networks can be used for a network attachment with a second subscriber identity is a main part of the present solution. Apparently only the SIM has to be adapted for this solution. Specifically the known mobile device behaviour is reused advantageously. Accordingly, FIG. 1 and its following description focus on the steps performed in the SIM.

For example after the mobile device is turned on 51, the mobile device ME reads S2 data from the SIM, preferably by sending at least one corresponding read request. Before providing the requested data, the SIM may perform at least one of the additional steps S3 to S6.

In step S3 the SIM decides whether to continue in a normal operating mode or to switch in a network searching operating mode. Preferably, the SIM checks the location of the mobile device ME for this decision. If the SIM finds the mobile device to be in its home location, it would continue in a normal mode. Accordingly, it would provide its regular data elements, like regular IMSI, regular FPLMN list and regular PLMN list to the mobile device. The process would thus be finalized by steps of providing the regular data and network attachment, corresponding to steps S14 and S15 in FIG. 1.

If the SIM however finds the mobile device to be in a (predetermined or any other) remote location, the SIM switches its operating mode into the network searching mode of the present solution.

Instead of using a pre-stored (fixed) IMSI_F, according to the improved embodiment shown in FIG. 1, the SIM generates S4 the first, forbidden IMSI IMSI_F. Such dynamic forbidden subscriber identity IMSI_F for example may be generated based on location information of the mobile device.

Furthermore, it may set S5 a trigger for the end of the network searching mode. The trigger could be a timer. The SIM may either use an internal trigger (internal timer) or request the mobile device to be informed about a trigger event (expiry of the timer, user action, network request ...). Further the trigger event could be receipt of a predetermined, e.g. the most preferred, network in the update or reaching a predetermined maximum number of updates to be received.

Furthermore, the SIM performs a first step of deleting S6 the list of forbidden networks (FPLMN list). It thereby ensures that the mobile device also tries to attach to even those networks included in the regular FPLMN list. The regular FPLMN list may be saved in the SIM and restored later in step S12 when re-entering the normal operating mode. Finally, before step S7 the SIM could amend the list of preferred networks, e.g. based on location information. It could thereby influence the order in which attachment to the networks is tried.

An empty FPLMN list and the generated forbidden subscriber identity IMSI_F are provided to the mobile device in step S7. Network attachment attempts S8 by the mobile device and updates for the FPLMN list received S9 by the SIM follow. Steps S8 and S9 in FIG. 1 comprise steps S81-S3, S84a, S84b, S85a, S85b, S86a, S86b and S91-S93 of FIG. 2 respectively. Steps S8 and S9 may also be referred to as the network scanning phase.

In the network selection mode the SIM thus receives S9 updates including available networks until the trigger event occurs S10 for terminating the network scanning phase S8, S9. If for example the timer, which is used S5 as the trigger event, expires S10, the SIM performs steps S11 to S13 (and S17) and then returns to the normal operating mode. As indicated above, the SIM may also terminate the network scanning phase S8, S9, when a predetermined network is received in the update or a predetermined maximum number of updates to be received in the network searching mode is reached.

Each received update S9 includes an available network. In the SIM the updates form a list of available networks (in the FPLMN list) and the SIM uses the received updates for network selection S11 for its regular subscriber identity IMSI_P. Hence, the SIM selects one of the networks included in the updates as a network to attach to with IMSI_P. It may amend PLMN accordingly, e.g. by storing the selected network as the most preferred network therein. Alternatively, the SIM explicitly informs the mobile device about the selected network, e.g. in step S15. As already indicated above the FPLMN list may be deleted again or restored in step S12.

Thereafter the SIM sends a "refresh" request S13 to the mobile device. This request forces the mobile device to use the amended SIM data (amended values of IMSI and FPLMN). In response to the read request S14 of the mobile device ME, the SIM now provides S15 its regular IMSI IMSI_P. The restored FPLMN list and the amended PLMN list may be provided as well.

Network attachment S16 by the mobile device ME to the selected network will be successful for the regular IMSI IMSI_P. As a final step in the network selection mode the SIM may forward the list of available networks to a network entity (server). This enables the server e.g. to perform a second network selection and/or to determine an updated PLMN list for the SIM. The mobile device ME will then detach from the network selected by the SIM and attach to the network selected by the server. As illustrated by step S19 the SIM may receive an update for its PLMN list from the server.

In the above embodiments the SIM may delete, amend or replace its data files for IMSI, PLMN or FPLMN. Alternatively, it could also use shadow files for such data elements in the network searching operating mode and the original files in the normal operating mode. In a further alternative the SIM could e.g. receive the update for the FPLMN without updating the FPLMN list, but creating a separate list of available networks from the updates only.

The invention claimed is:

1. A method performed in an identification module SIM of a device in a mobile communication system, the method comprising:
    providing a first subscriber identity IMSI_F to the device, the first subscriber identity IMSI_F being a forbidden subscriber identity;
    receiving updates for a list of forbidden networks FPLMN stored in a memory of the identification module;
    using the received updates as a list of available networks for a second subscriber identity IMSI_P, the second subscriber identity IMSI_P being a regular subscriber identity; and
    providing the second subscriber identity IMSI_P to the device.

2. The method according to claim 1, wherein the first subscriber identity IMSI_F is adapted to cause receipt of updates for the list of forbidden networks and/or the second subscriber identity IMSI_P is adapted to enable network attachment by the device.

3. The method according to claim 1, further comprising deleting the list of forbidden networks.

4. The method according to claim 3, wherein deleting the list of forbidden networks is performed prior to providing the first subscriber identity and/or providing the second subscriber identity.

5. The method according to claim 1, further comprising generating the first subscriber identity IMSI_F in the identification module based on location information.

6. The method according to claim 1, wherein using the received updates comprises selecting one of the networks from the list of available networks for network attachment.

7. The method according to claim 1, wherein using the received updates comprises providing the list of forbidden networks as a list of available networks for network selection by a network entity.

8. The method according to claim 1, wherein the first subscriber identity IMSI_F contains an unacceptable MNC for networks at a location of the mobile device.

9. The method according to claim 1, wherein the first subscriber identity IMSI_F contains an unacceptable MCC for networks at a location of the mobile device.

10. The method according to claim 1, wherein the first subscriber identity IMSI_F contains an unacceptable MNC and/or MCC compared to all possible networks at a location of the mobile device.

11. The method according to claim 1, wherein the first subscriber identity IMSI_F contains a dummy MCC and/or MNC.

12. The method according to claim 1, wherein a list of preferred networks is amended for attempts of the mobile device to attach to networks using the first subscriber identity.

13. An identification module SIM adapted to perform the method recited in claim 1.

14. A system comprising the identification module of claim 13 and the device, the device being a user's mobile device including the identification module or a stationary device including the identification module.

15. The system according to claim 14 further comprising a network server that receives the list of forbidden networks and performs network selection based on the received list.

* * * * *